United States Patent [19]
Johnson

[11] Patent Number: 5,964,439
[45] Date of Patent: Oct. 12, 1999

[54] ARTICULATABLE POSITIONING DEVICE

[75] Inventor: Dale S. Johnson, Buffalo, N.Y.

[73] Assignee: Aztech, Inc., Amherst, N.Y.

[21] Appl. No.: 08/858,907

[22] Filed: May 19, 1997

[51] Int. Cl.[6] .................................................. E04G 3/00
[52] U.S. Cl. ...................................... 248/278.1; 403/116
[58] Field of Search ............................. 248/276.1, 230.3, 248/292.12, 278.1, 284.1, 289.11; 403/116, 113, 112; 135/76, 72; 280/647, 250.1, 304.1, 304.3, 304.5

[56] References Cited

U.S. PATENT DOCUMENTS

| | | | |
|---|---|---|---|
| 3,193,674 | 7/1965 | Fleming | 248/278.1 X |
| 3,995,650 | 12/1976 | Divito | 135/72 |
| 4,089,084 | 5/1978 | Droz | 403/116 X |
| 4,941,496 | 7/1990 | Berning | 135/67 |
| 4,943,181 | 7/1990 | Murphy | 403/116 X |
| 4,964,603 | 10/1990 | Yair | 248/278.1 X |
| 5,284,313 | 2/1994 | Hallgren | 248/279 |
| 5,319,994 | 6/1994 | Miller | 74/551.8 |
| 5,499,645 | 3/1996 | Baliga | 135/67 |
| 5,551,660 | 9/1996 | Leduchowski | 248/276.1 |

*Primary Examiner*—Ramon O. Ramirez
*Attorney, Agent, or Firm*—Hodgson, Russ, Andrews, Woods & Goodyear LLP

[57] ABSTRACT

An articulatable mounting device for positioning a hand grip or a tool interface in a particular position, is described. The articulatable positioning device comprises a mounting means having variously sized curved surfaces for contacting a plurality of different sized tubing in an area contact relationship. The articulatable mounting device also comprises two pairs of mating serrated surfaces that provide a wide range of articulatable motion for the hand grip or tool interface with respect to the mounting means and the associated tubular support. A slotted connection between the pair of serrated surface further increases the range motion.

15 Claims, 3 Drawing Sheets

ARTICULATABLE POSITIONING DEVICE

The invention described in this application was made under a grant from the Department of Education.

BACKGROUND OF THE INVENTION

1. Field of Invention

The present invention generally relates to an articulatable positioning device, and more particularly to a hand grip device for aiding a person using an ambulatory assistance device. Still more particularly, the present invention relates to an adjustable hand grip device that is intended to be mounted on at least one of the arms of an ambulatory assistance device such as a wheelchair, a walker and the like to aid the person being assisted.

The present invention was developed to facilitate the needs of physically disabled persons who require articulate positioning of hand grips to conform with their upper extremity limitations. The hand grip is adjustable through a wide range of articulatable motion and then locked in a position which is comfortable and easily reached by the person being assisted. For example, the articulatable hand grip device of the present invention is adjustable into a wide range of positions which are easily accessible and comfortable for aiding a person attempting to get into and out of a wheelchair or attempting to reposition them self once they are seated. A preferred form of the hand grip device includes a mounting means having split clamping members which are joined about a cylindrical support structure such as the arm of a wheelchair to mount the hand grip to the chair. Preferably, the clamping members each have at least one matched arced clamping surface so that the mounting means provided a wide area clamping contact on the arm of the wheelchair.

The articulatable positioning device of the present invention is also applicable to mount many other accessories for wheelchairs, walkers and other ambulatory aids, or any other application utilizing tubing as a structural support wherein particular positioning of an accessory in a comfortable and convenient location is required while maintaining stability and rigidity. In that case, the hand grip is replaced by a tool interface. The tools could be trays, switch mounts, fishings pole holders and umbrella holders, and the like.

2. Prior Art

A number of mounting systems and hand grip devices have been constructed for conventional walkers and wheelchairs to accommodate physically disabled individuals. Of particular note is U.S. Pat. No. 5,284,313 to Hallgren which relates to an adjustable mounting system comprised of an adjustable arm capable of a wide range of motion including a telescopic feature to extend the length of the arm and a supporting clamp mountable on a tubular support structure, such as a wheelchair arm. The supporting clamp has an upper jaw with a U-shaped recess and a lower jaw having a threaded shaft with a flattened contact area to capture the tubular structure of the wheelchair or other rigid support structure therebetween. The problem is that the curved surface of the U-shaped recess in conjunction with the threaded shaft is inadequate to securely mount the Hallgren mounting system to the tubular support, in large part due to the line contact provided by the threaded shaft. Also, the curved recess will only fit one size of tubular support.

The clamping recess of the present invention accepts a plurality of different sized tubing by providing the split-collar clamps with a plurality of matching curved surfaces for contacting various diameter tubes. This construction provides a more stable mounting structure by distributing the clamping pressure to an area on the tube rather than concentrating it on a plurality of line contacts or a curved surface and opposed line contact. In addition, the mounting device of the present invention precludes the need for different sized split clamps to accommodate different sized tubular supports.

Also, the present articulatable positioning device has a wider range of movement than the mounting system described by Hallgren. Thus, while the Hallgren patent provides a system for holding a device in a particular position by use of an adjustable arm and mounting apparatus, it does not provide the stability and adaptability available in the present invention.

SUMMARY OF THE INVENTION

The present invention is an adjustable, stable and rigid articulatable mounting device for positioning a hand grip or a tool interface in a particular position. In the former case, the hand grip is capable of supporting the weight of a person attempting to get into or out of a wheelchair or attempting to reposition them self while seated. The articulatable positioning device of the present invention comprises a mounting means for mounting the device to different sized tubular support structures, for example of a wheelchair, walker, or other ambulatory aids. The mounting means provide various mating curved surfaces for contacting a plurality of different sized tubing in an area contact relationship.

The articulatable mounting device of the present invention also comprises two pairs of mating serrated surfaces that provide a wide range of articulatable motion for the hand grip or tool interface with respect to the mounting means and the associated tubular support. A slotted connection between the pair of serrated surfaces further increases the range of motion.

In that respect, the present invention is particularly useful for supporting and positioning chair accessories including a grab bar, joystick, tray, and fishing pole holder to enable convenient access to such accessories by those seated in the chair, or more particularly, to position an accessory at a particular angle and height relative to a person's configuration in a wheelchair. Other uses of this invention for wheelchairs include mounts for trays, augmentative communication devices and many other holding applications.

In relation to walkers, the present invention relates to a hand grip that is articulatable to a particular angle, height and position convenient for a user's particular preference. To this end, the articulatable hand grip device of the present invention generally stated, relates to an adjustable hand hold for persons requiring a customized grip suited for their upper extremity needs.

In that respect, the present articulatable device is envisioned to be applicable to any field using tubing as a rigid support structure requiring stable and adjustable positioning of aids. Other uses anticipated for the articulatable positioning device of the present invention include bicycles, recreational equipment and industrial machining and the like. Additional uses of the present invention will become apparent from the following detailed description and drawings disclosing what is presently contemplated.

DETAILED DESCRIPTION OF THE DRAWING

Figure 1:
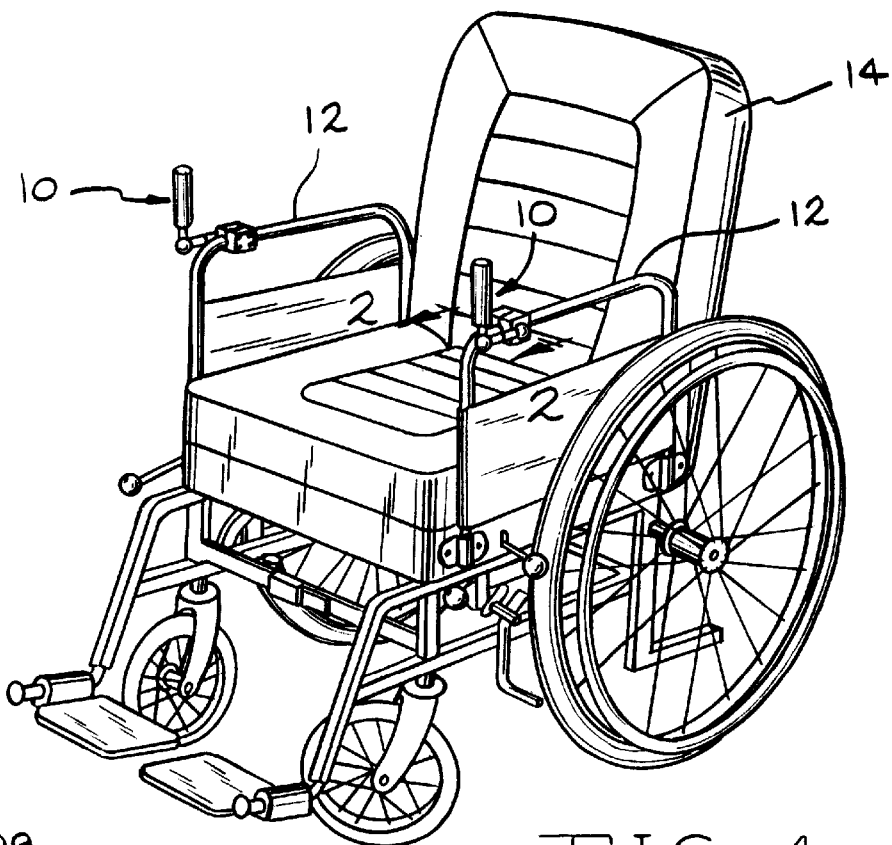
FIG. 1 is a perspective view of the hand grip device 10 of the present invention
Figure 2:
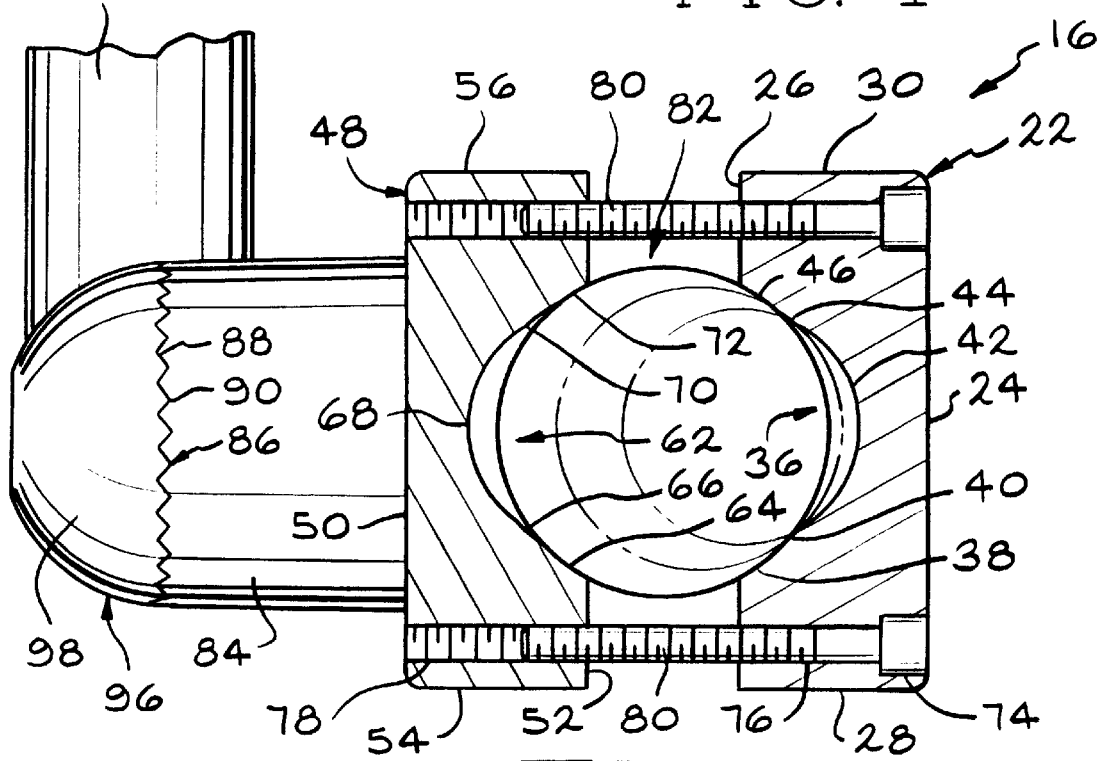
FIG. 2 is an enlarged, partial, cross-sectional view taken along line 2—2 of FIG. 1.
Figure 3:
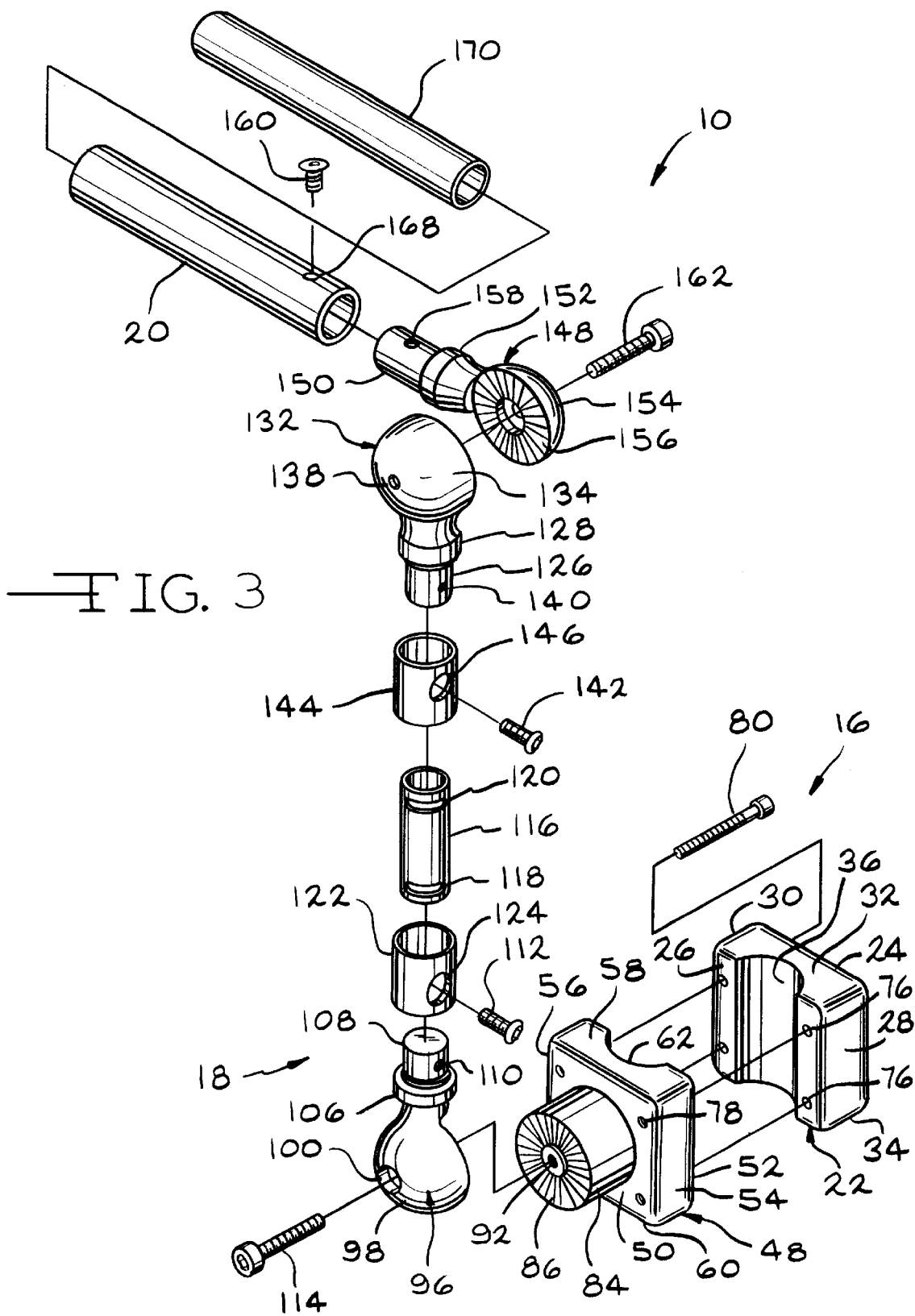
FIG. 3 is an exploded view of the hand grip device 10 shown in FIG. 1.

Turning now to the drawings, FIG. 1 shows a pair of articulatable positioning devices, more particularly adjustable hand grip devices 10 according to the present invention, one device mounted on each arm 12 of a wheelchair 14. As shown in FIGS. 2 and 3, the hand grip device 10 includes a split mounting means 16 for mounting the device to a cylindrical support structure such as the arm 12 of the wheelchair 14, and an articulating arm portion 18 for positioning and locking a hand bar 20 in a desired position. It should be apparent to those skilled in the art, however, that while the adjustable hand grip device 10 is shown mounted on the wheelchair 14, that is for illustrative purposes only. It is contemplated by the scope of the present invention that the adjustable hand grip device 10 can be mounted on a wide variety of support structures including walkers, bicycles and industrial machinery, and the like.

As shown in FIGS. 2 and 3, the split mounting means 16 of the hand grip device 10 includes a first clamping member 22 having an outer side wall 24 and an opposed inner side wall 26 joined by spaced apart end walls 28 and 30, a top wall 32 and a bottom wall 34. A first curved recess 36 is provided in the inner side wall 26 and includes a plurality of meeting curved surfaces forming a generally U-shaped indentation. The first curved recess 36 consists of a first curved surface 38 that arcs to meet with a second curved surface 40 that in turn arcs to meet with a third curved surface 42 extending in a partial U-shaped arc to a fourth curved surface 44 that arcs to a fifth curved surface 46 that meets the inner side wall 26 opposite the beginning of the first curved surface 38. The first and fifth curved surfaces 38, 46 are of a similar radius as are the second and fourth curved surfaces 40, 44.

The second clamping member 48 of the split mounting means 16 includes an outer side wall 50 and an opposed inner side wall 52 joined by spaced apart end walls 54 and 56, a top wall 58 and a bottom wall 60. A second curved recess 62 is provided in the inner side wall 52 and includes a plurality of meeting curved surfaces forming a generally U-shaped indentation. As shown in FIG. 2, the second curved recess 62 consists of a sixth curved surface 64 that arcs to meet with a seventh curved surface 66 that in turn arcs to meet with an eighth curved surface 68 extending in a partial U-shaped arc to a ninth curved surface 70 that arcs to a tenth curved surface 72 that meets the inner side wall 52 opposite the beginning of the sixth curved surface 64. The sixth and tenth curved surfaces 64, 72 are similar in radius as are the seventh and ninth curved surfaces 66, 70.

An inlet 74 leading to a lesser diameter, cylindrical bore 76 is provided adjacent to each of the four corners of the outer wall 24 of the first clamping member 22 extending to the inner wall 26. A threaded bore 78 is provided adjacent to each of the four corners of the outer wall 50 of the second clamping member 48 extending to the inner wall 52. When the first and second clamping members 22 and 48 are joined together with the respective inner side walls 26, 52 contacting each other and with the through bores 76 in registry with the threaded bores 78, a threaded member 80 is received in each inlet 74 and bore 76 and threaded into the threaded bore 78 to secure the first and second clamping members 22, 48 together. This joins the respective first and second curved recesses 36, 62 to thereby form a clamping bore 82 for mounting the hand grip device 10 on a cylindrical support structure, such as the arm 12 of the wheelchair 14.

With the first and second clamping members 22, 48 forming the clamping bore 82, the first, fifth, sixth and tenth curved surfaces 38, 46, 64 and 72 are of a similar radius forming a first clamping structure, the second, fourth, seventh and ninth curved surfaces 40, 44, 66 and 70 are of a similar radius forming a second clamping structure and the third and eighth curved surfaces 42, 68 are of a similar radius forming a third clamping structure. The first, second and third clamping structures provide for mounting the hand grip device 10 of the present invention on variously sized tubing diameters comprising the arm 12 of the wheelchair 14, as will be explained in detail hereinafter.

Figure 5:
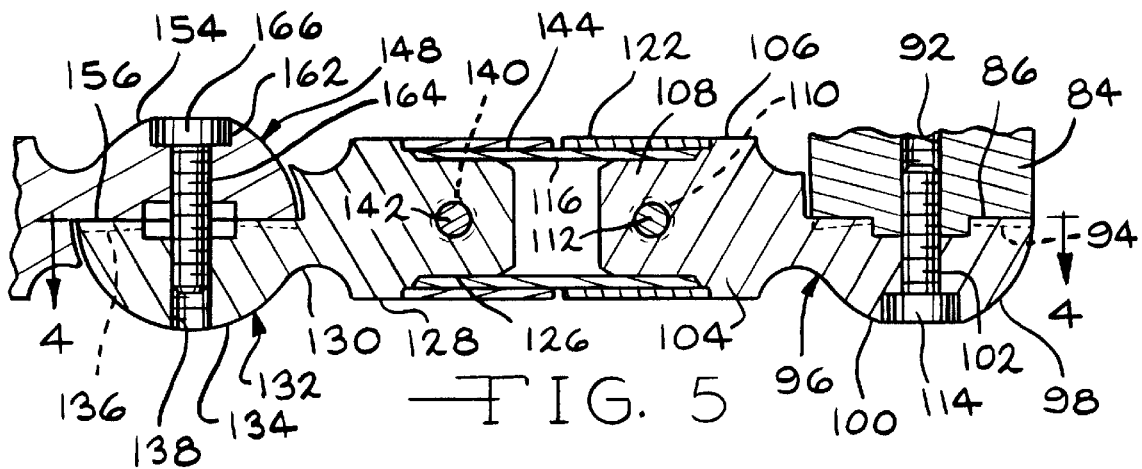
FIG. 5 a is cross sectional view taken along line 5—5 of FIG. 4.

A cylindrically shaped protrusion 84 is provided on the outer side wall 50 of the second clamping member 48 extending to a first annular serrated surface 86. The first serrated surface 86 comprises ridges 88 and valleys 90 (FIG. 2) alternating in an endless sinusoidal pattern about a threaded bore 92 (FIG. 5) extending axially along the longitudinal axis of protrusion 84, generally normal to a plane bisecting the sinusoidal structure.

Figure 4:
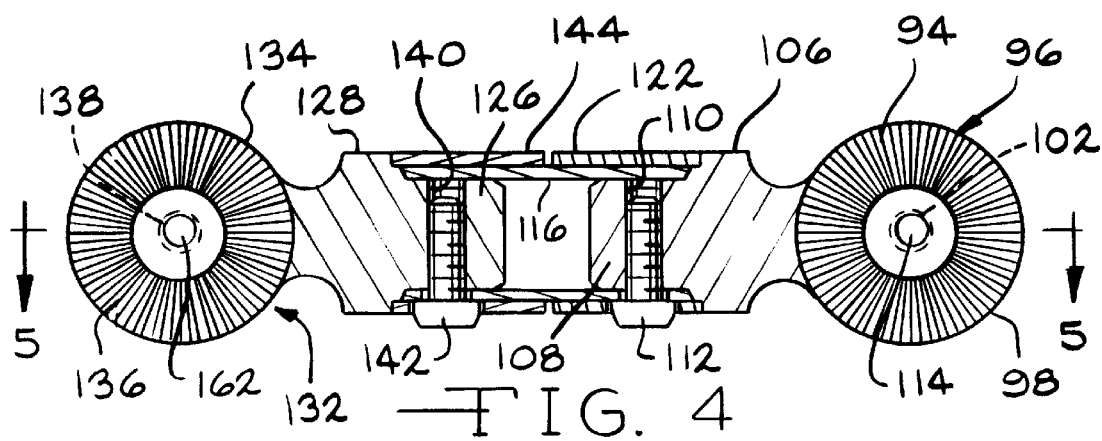
FIG. 4 is a cross-sectional view taken along line 4—4 of FIG. 6.

The first serrated surface 86 of protrusion 84 is sized to mate with a second serrated surface 94 (shown in dashed lines in FIG. 5) of a first rotatable arm 96. The first rotatable arm 96 includes a curved outer surface 98 in the shape of a half dome meeting the majority of the perimeter of the second serrated surface 94. An inlet 100 leading to a through bore 102 (shown in dashed lines in FIG. 4) is centered along the axis of the half dome 98 leading to the second serrated surface 94. The first rotatable arm 96 further includes an enlarged ring 106 and a cylindrical extension 108 connected to the half dome 98, normal to the axis of the through bore 102. The cylindrical extension 108 is of a lesser diameter than ring 106. A threaded bore 110 (shown in dashed lines in FIG. 5) is provided through the diameter of the cylindrical extension 108, normal to the axis thereof, for receiving a threaded member 112. A threaded member 114 is received in the through bore 102 and threaded into bore 92 to mate the serrated surfaces 86 and 94 of the respective cylindrical extension 84 and the first rotatable arm 96.

A hollow, cylindrically shaped containment sleeve 116 comprises a pair of arcuate slots 118 and 120 provided adjacent to the opposed first and second ends thereof. The slots 118, 120 are aligned with each other and are of about a 120 degree arc. The inner diameter of sleeve 116 is sized to fit over the cylindrical extension 108 in a closely-spaced relationship, abutting the enlarged ring 106. The first end of sleeve 116 enclosing the cylindrical extension 108 of the first rotatable arm 96 is provided with the first arcuate slot 118.

A cylindrical collar 122 fits over the containment sleeve 116 and is provided with a circular opening 124. In use, the first end of the sleeve 116 is fitted onto the cylindrical extension 108 of arm 96 with collar 122 surrounding the sleeve 116. Then, when the first arcuate slot 118 is aligned with the threaded bore 110 and the opening 124 in collar 122, the threaded member 112 is received in the threaded bore 110 to secure the sleeve 116 to the extension 108 of the first rotatable arm 96 with the head of the threaded member 112 surrounded by the perimeter of the opening 124 in collar 122. In that respect, the collar 122 is not a necessary part of the hand grip device 10 of the present invention, but instead is provided for aesthetic purposes to contour the connection between the rotatable arm 96 and sleeve 116.

The opposite end of sleeve 116 is similarly adapted to receive a second cylindrical extension 126 meeting an enlarged ring 128 of a second rotatable arm 132. The second rotatable arm 132 further comprises a curved outer surface 134 in the shape of a half dome meeting the majority of the perimeter of a third serrated surface 136 (shown in dashed lines in FIG. 5). The third serrated surface 136 is similar to the first and second serrated surfaces 86 and 94. A threaded bore 138 (shown in dashed lines in FIG. 4) is centered along the axis of the half dome 134 leading to the serrated surface 136. In that respect, the second rotatable arm 132 is similar to the first rotatable arm 96 with the exception that the first arm 96 has the through bore 102 while the second arm 132 has the threaded bore 138.

The cylindrical extension 126 of the second rotatable arm 132 is provided with a threaded bore 140 (shown in dashed lines in FIG. 5), normal to the axis thereof, for receiving a threaded member 142. The cylindrical extension 126 of the second rotatable arm 132 fits in a closely-spaced relationship inside of the opposite, second end of the containment sleeve 116. A cylindrical collar 144, similar to collar 122, fits over the second end of the containment sleeve 116 and is provided with a circular opening 146. In use, sleeve 116 is fitted onto the cylindrical extension 126 of the second rotatable arm 132 with collar 144 received over sleeve 116. Then, when the second arcuate slot 120 is aligned with the threaded bore 140 and the opening 146 in collar 144, the threaded member 142 is received in the bore 140 to secure the sleeve 116 to the extension 126 of the second rotatable arm 132 with the head of the threaded member 142 surrounded by the perimeter of the opening 146 in collar 144. As with the first collar 122, collar 144 is not required to practice the present invention, but is provided for aesthetic purposes to contour the connection between the second arm 132 and sleeve 116.

A third rotatable arm 148, similar to the first rotatable arm 96, includes a cylindrical extension 150 and an enlarged ring 152 connected to a curved outer surface 154 in the shape of a half dome meeting the majority of the perimeter of a fourth serrated surface 156, similar to the serrated surfaces 86, 94 and 136. A threaded bore 158 is provided through the diameter of the cylindrical extension 150, normal to the axis thereof, for receiving a threaded member 160. An inlet 162 leading to a through bore 164 is centered along the axis of the half dome 154 leading to the serrated surface 156. A threaded member 166 is received in the through bore 164 of the third rotatable arm 148 and threaded into the threaded bore 138 in the second rotatable arm 132 to mate the respective serrated surfaces 156 and 136 for positioning the second and third rotatable arms 132, 148 with respect to each other.

As shown in FIG. 3, the hand bar 20 is a cylindrically shaped member serving as a grab bar for the hand grip device 10. The hand bar 20 is sized to fit in a closely-spaced relationship over the cylindrical extension 150 abutting the enlarged ring 152. An opening 168 in bar 20 receives the threaded member 160 threaded into the threaded bore 158 of the cylindrical extension 150 to secure the grab bar 20 to the third rotatable arm 148.

A cover 170 is provided for enclosing the grab bar 20. Cover 170 is preferably of a relatively soft elastomeric material and is provided in a shrink-fit relationship on the grab bar 20. That way, the cover 170 provides a comfortable surface for gripping the bar 20, for example when the hand grip device 10 is mounted to the arm 12 of the wheelchair 14.

In Use

The second serrated surface 94 of the first rotatable arm 96 is adjustable relative to the first serrated surface 86 of the cylindrical protrusion 84 extending from the second clamping member 48 and about the axis of the respective bores 102 and 92 by unthreading the threaded member 114 from the bore 92 to release the ridges of the serrated surfaces 86 and 94 of the protrusion 84 and of the first rotatable arm 96 from the valleys of the other. The protrusion 84 and the arm 96 are then rotatable with respect to each other to position the extension 108 of arm 96 relative to the clamping means 16. The threaded member 114 is re-threaded into the bore 92 to secure the various ridges in the receiving valleys to lock the first rotatable arm 96 relative to the mounting means 16. The first rotatable arm 96 is rotatable 360 degrees about the axis of the threaded member 114 with respect to the cylindrical protrusion 84 of the clamping means 16.

The containment sleeve 116 is rotatable relative to the longitudinal axis of the extension 108 of the first rotatable arm 96 by loosening the threaded member 112 from threaded bore 110. Then, the sleeve 116 rotates about the 120 degree arc provided by slot 118 to position the second and third rotatable arms 132, 148 and the connected grab bar 20 relative to the first rotatable arm 96 and the split mounting means 16.

The containment sleeve 116 is also rotatable relative to the longitudinal axis of the extension 126 of the second rotatable arm 132 by loosening the threaded member 142 from the threaded bore 140. Then, the sleeve 116 rotates about the 120 degree arc provided by slot 120 to position the second and third rotatable arms 132, 148 and the connected grab bar 20 relative to the first rotatable arm 96 and the split mounting means 16. This rotational movement is independent of that afforded by the slot 118 in sleeve 116.

That way, the containment sleeve 116 provides for about 240 degrees of rotation movement of the second and third rotatable arms 132, 148 relative to the first rotatable arm 96 and the split mounting means 16. The first 120 degrees of rotation provided by one of slots 118 and 120, and the remaining 120 degrees of rotation provided by the other slot.

The fourth serrated surface 156 of the third rotatable arm 148 is adjustable relative to the third serrated surface 136 of the second rotatable arm 132 and about the axis of the respective bores 164 and 138 by unthreading the threaded member 166 from the bore 138 to release the ridges of the serrated surfaces 136 and 156 of the third and fourth rotatable arm 132, 148 from the valleys of the other. The arms 132, 148 are then rotatable with respect to each other to position grab bar 20 relative to the second rotatable arm 132. The threaded member 166 is then re-threaded into the bore 138 to secure the various ridges in the receiving valleys to lock the third rotatable arm 148 and the grab bar 20 relative to the second rotatable arm 132. The second rotatable arm 132 is rotatable with respect to the third rotatable arm.

The hand grip device 10 of the present invention is mountable on a variety of tubular or cylindrically-shaped support structure by the provision of the split mounting means 16. To mount the articulatable device on a tubular support structure such as the arm 12 of the wheelchair, the threaded members 80 are unthreaded from the threaded bores 78 to separate the first clamping member 22 from the second clamping member 48. The clamping members 22, 48 are positioned on either side of the tubular arm 12 received in the respective first and second curved recesses 36, 62. The clamping members 22, 48 are then brought together with their respective inner side walls 26, 52 contacting each other.

The threaded members are then re-threaded into the threaded bores 78 to bring one of the similar radial surfaces 38, 46, 64 and 72 of the first clamping structure, the radial surfaces 40, 44, 66 and 70 of the second clamping structure and the radial surfaces 42, 68 of the third clamping structure into compressive contact with the outer surface of the tubular arm 12 of the wheelchair 14 to mount the hand grip device 10 thereon.

Thus, an important aspect of the present invention is that the first, second and third clamping structures provide for mounting the hand grip device 10 on tubular structures having a variety of diameters without having to change the first and second clamping members 22, 48. Preferably, the first clamping structure is of a lesser diameter or radial extent than the second clamping structure which in turn is lesser than the third clamping structure. That way, the split mounting means 16 of the present hand grip device 10 provides for area contact with the support structure, for example arm 12 of wheelchair 14, which is an improvement over the line contact provided by the prior art devices.

Additionally, the rotational relationship between the first and second serrated surfaces 86, 94 of the respective cylindrical protrusion 84 extending from the second clamping member 48 and the first rotatable arm 96, the rotational movement 116 relative to the first rotatable arm 96 along slot 118, the rotational movement of the sleeve 116 relative to the second rotational arm 132 along slot 120, and the rotational movement between the third and fourth serrated surfaces 136, 156 of the respective second and third rotational arms 132, 148 provide for a wide range of motion of the grab bar 20 relative to the arm 12 of the wheelchair 14. This provides the person attempting to sit down or stand up out of the wheelchair a wide range of positions for the hand grip 20 to aid that person.

It is appreciated that various modifications to the inventive concepts described herein may be apparent to those of ordinary skill in the art without departing from the spirit and scope of the present invention as defined by the appending claims.

What is claimed is:

1. An articulatable positioning device mounted to a support structure to adjust the position of an interface device relative to the support structure, which comprises:

a) a mounting assembly mounted to the support structure;

b) a first sinusoidal surface connected to the mounting assembly and consisting of alternating ridges and valleys extending about a first axis of the first sinusoidal surface;

c) a first arm having a second sinusoidal surface consisting of alternating ridges and valleys extending about a second axis of the first arm such that when the first and second axes coincide, the first and second sinusoidal surfaces are adjustably matable with the ridges of one received in the valleys of the other to adjust a position of the first arm with respect to the mounting assembly;

d) a rotatable member having opposed first and second ends, wherein the first end of the rotatable member is connected to the first arm at an end opposite the second sinusoidal surface, and wherein one of the first end of the rotatable member and the opposite end of the first arm has a first arcuate slot and the other has a pin received in the slot to provide for rotational movement between the rotatable member and the first arm;

e) a second arm connected to the second end of the rotatable member and having a third sinusoidal surface consisting of alternating ridges and valleys extending about a third axis of the third sinusoidal surface, wherein one of the second end of the rotatable member and an opposite end of the second arm opposite the third sinusoidal surface has a second arcuate slot and the other has a pin received in the slot to provide for rotational movement between the rotatable member and the second arm;

f) a fourth sinusoidal surface of a third arm consisting of alternating ridges and valleys extending about a fourth axis of the third arm such that when the third and fourth axes coincide, the third and fourth sinusoidal surfaces are adjustably matable with the ridges of one received in the valley of the other to rotate the second arm with respect to the third arm, wherein the first arm is rotatable with respect to the mounting assembly about the coinciding first and second axes by the mating first and second sinusoidal surfaces and the third arm adapted to support the interface device is rotatable with respect to the second arm about the coinciding third and fourth axes by the mating third and fourth sinusoidal surfaces and the first arm is rotatable with respect to the rotatable member along the first arcuate slot and the rotatable member is rotatable with respect to the second arm along the second arcuate slot to adjust the position of the interface device with respect to the mounting assembly mounted to the support structure.

2. The articulatable positioning device of claim 1 wherein the first sinusoidal surface is adjustable with respect to the second sinusoidal surface 360° about the coinciding first and second axes.

3. The articulatable positioning means of claim 1 wherein the rotational movement of the rotatable member with respect to the first arm along the first arcuate slot and the rotational movement of the rotatable member with respect to the second arm along the second arcuate slot are independent of each other.

4. The articulatable positioning means of claim 1 wherein the mounting assembly comprises first and second mounting members having at least one matching arcuate clamping surface provided by each mounting member such that when the mounting members are joined about a cylindrically shaped portion of the support structure, the matching arcuate clamping surfaces contact the support structure in an area clamping contact.

5. The articulatable means of claim 4 wherein the first and second mounting members each have at least two matching arcuate clamping surfaces of a different radius to provide for separately mounting the articulatable positioning means on at least two cylindrically shaped support surfaces of different diameters.

6. The articulatable positioning means of claim 5 wherein there are three matching articulate clamping surfaces of different radius provided by each of the first and second mounting members.

7. The articulatable positioning means of claim 1 wherein the interface means is a hand grip.

8. The articulatable positioning means of claim 1 wherein the interface means is a tool interface.

9. The articulatable positioning device of claim 1 wherein the rotatable member has a cylindrical shape with the first and second arcuate slots provided at opposed ends thereof and spaced radially outwardly from a longitudinal axis of the rotatable member and wherein when the rotatable member is connected to the first arm and the second arm, the longitudinal axis of the rotatable member is normal to the coincident first and second axes and the coincident third and fourth axis.

10. An articulatable positioning device mounted to a support structure to adjust the position of an interface device relative to the support surface, which comprises:

a) a mounting assembly having first and second mounting members that are joined together to provide a generally cylindrical enclosure that is substantially similar in diameter to a cylindrical shape of the support structure to mount the mounting assembly to the support structure, wherein the first and second mounting members of the mounting assembly include at least two matching arcuate clamping surfaces of a different radius to provide for separately mounting the articulatable positioning means on at least two cylindrically shaped support surfaces of different diameters;

b) a first sinusoidal surface connected to one of the first and second mounting members and consisting of alternating ridges and valleys extending about a first axis of the first sinusoidal surface;

c) a first arm having a second sinusoidal surface consisting of alternating ridges and valleys extending about a second axis of the first arm such that when the first and second axes coincide, the first and second sinusoidal surfaces are adjustably matable with the ridges of one received in the valleys of the other to adjust a position the first arm with respect to the mounting means;

d) a rotatable member having opposed first and second ends, wherein the first end of the rotatable member is connected to the first arm at an end opposite the second sinusoidal surface, and wherein one of the first end of the rotatable member and the opposite end of the first arm has a first arcuate slot and the other has a pin received in the slot to provide for rotational movement between the rotatable member and the first arm;

e) a second arm connected to the second end of the rotatable member and having a third sinusoidal surface consisting of alternating ridges and valleys extending about a third axis of the third sinusoidal surface, wherein one of the second end of the rotatable member and an opposite end of the second arm opposite the third sinusoidal surface has a second arcuate slot and the other has a pin received in the slot to provide for rotational movement between the rotatable member and the second arm; and f) a fourth sinusoidal surface of a third arm consisting of alternating ridges and valleys extending about a fourth axis of the third arm such that when the third and fourth axes coincide, the third and fourth sinusoidal surfaces are adjustably matable with the ridges of one received in the valley of the other to rotate the second arm with respect to the third arm, g) wherein the first arm is rotatable with respect to the mounting assembly about the coinciding first and second axes by the mating first and second sinusoidal surfaces and the third arm adapted to support the interface device is rotatable with respect to the second arm about the coinciding third and fourth axes by the mating third and fourth sinusoidal surfaces and the first arm is rotatable with respect to the rotatable member along the first arcuate slot and the rotatable member is rotatable with respect to the second arm along the second arcuate slot to adjust the position of the interface with respect to the mounting assemble mounted to the support structure.

11. A method for aiding a person requiring a hand grip means mounted to a wheelchair or a walker to aid that person in repositioning their body with respect to the wheelchair or the walker, comprising the steps of:

a) providing an articulatable positioning device mounted to the wheelchair or the walker, the articulatable positioning device comprising:

i) a mounting assembly having first and second mounting members joined together to provide a generally cylindrical enclosure that is substantially similar in diameter to a cylindrical shape of the wheelchair or the walker wherein one of the first and second mounting members has a first sinusoidal surface consisting of alternating ridges and valleys extending about a first axis of the first sinusoidal surface;

ii) a first arm having a second sinusoidal surface consisting of alternating ridges and valleys extending about a second axis of the first arm such that when the first and second axes coincide, the first and second sinusoidal surfaces are adjustably matable with the ridges of one received in the valleys of the other to adjust a position of the first arm with respect to the mounting assembly;

iii) a rotatable member having opposed first and second ends, wherein the first end of the rotatable member is connected to the first arm at an end opposite the second sinusoidal surface, and wherein one of the first end of the rotatable member and the opposite end of the first arm has a first arcuate slot and the other has a first pin received in the slot to provide for rotational movement between the rotatable member and the first arm;

iv) a second arm connected to the second end of the rotatable member and having a third sinusoidal surface consisting of alternating ridges and valleys extending about a third axis of the third sinusoidal surface, wherein one of the second end of the rotatable member and an opposite end of the second arm opposite the third sinusoidal surface has a second arcuate slot and the other has a second pin received in the slot to provide for rotational movement between the rotatable member and the second arm;

v) a fourth sinusoidal surface of a third arm consisting of alternating ridges and valleys extending about a fourth axis of the third arm such that when the third and fourth axes coincide, the third and fourth sinusoidal surfaces are adjustably matable with the ridges of one received in the valleys of the other to rotate the second arm with respect to the third arm; and vi) the hand grip connected to the third arm, wherein the first arm is rotatable with respect to the mounting assembly about the coinciding first and second axes by the mating first and second sinusoidal surfaces and the third arm is rotatable with respect to the second arm about the coinciding third and fourth axes by the mating third and fourth sinusoidal surfaces and the first arm is rotatable with respect to the rotatable member along the first arcuate slot and the rotatable member is rotatable with respect to the second arm along the second arcuate slot to adjust the position of the hand grip with respect to the mounting assembly mounted to the wheelchair or the walker;

b) joining the first and second mounting members together to mount the mounting means to the wheelchair or the walker; and c) independently adjusting the first arm with respect to the mounting assembly by adjusting the matable ridges of one of the first and second sinusoidal surfaces with the valleys of the other, and adjusting the first arm with respect to the rotatable member by adjusting the first pin along the first arcuate slot, and adjusting the rotatable member with respect to the second arm by adjusting the second pin along the second arcuate slot, and adjusting the second arm with respect to the third arm by adjusting the matable ridges of one of the third and fourth sinusoidal surfaces with the valleys of the other, thereby positioning the hand grip in a desired orientation with respect to the mounting assembly that is easily reached by the person to help that person to reposition their body.

12. The method of claim 11 including adjusting the first sinusoidal surface with respect to the second sinusoidal surface 360° about the coinciding first and second axes.

13. The method of claim 11 including providing the first and second mounting members of the mounting means having at least one matching arcuate clamping surface provided by each mounting member, and joining the mounting members about the cylindrically shaped support structure so that the matching arcuate clamping surfaces contact the support structure in an area clamping contact.

14. The method of claim 13 including providing the first and second mounting members each having at least two matching arcuate clamping surfaces of a different radius to provide for separately mounting the articulatable positioning means on at least two cylindrically shaped support surfaces of different diameters.

15. The method of claim 13 including providing three matching articulate clamping surfaces of different radius provided by each of the first and second mounting members.

* * * * *